US006935606B2

(12) United States Patent
Chan

(10) Patent No.: US 6,935,606 B2
(45) Date of Patent: Aug. 30, 2005

(54) FORMWORK

(76) Inventor: Wai Wing Chan, Flat C, 23/F., Tower 7, Tierra Verde, 33 Tsing King Road, Tsing Yi, N.T. (HK)

( * ) Notice: Subject to any disclaimer, the term of this patent is extended or adjusted under 35 U.S.C. 154(b) by 87 days.

(21) Appl. No.: 10/192,924

(22) Filed: Jul. 9, 2002

(65) Prior Publication Data

US 2003/0041541 A1 Mar. 6, 2003

(30) Foreign Application Priority Data

Aug. 31, 2001 (HK) ............................................. 01106152
May 22, 2002 (HK) ............................................. 02103832

(51) Int. Cl.[7] ................................................. E04G 9/00
(52) U.S. Cl. ....................... 249/189; 249/112; 249/113; 249/115
(58) Field of Search ................................. 249/189, 112, 249/113, 115

(56) References Cited

U.S. PATENT DOCUMENTS

| 5,169,585 A | 12/1992 | Le Gourrierec |
| 5,174,083 A | 12/1992 | Mussell |

FOREIGN PATENT DOCUMENTS

| CA | 2250606 | 4/2000 |
| GB | 2156416 | 10/1985 |
| JP | 02-043464 | 2/1990 |
| JP | 04-337363 | 11/1992 |
| JP | 05-194878 | 8/1993 |

OTHER PUBLICATIONS

Photosetting coating composition for application on concrete mold, Masato et al., Nov. 25, 1992,Patent Abstracts of Japan 04–33736.*

The use of fabric as a concrete form liner, Hanna, Oct. 15, 1998, CA 2250606.*

Visisble Light Photocatalysis in Nitrogen–Dope Titanium Oxides, Asahi, Jul. 13, 2001 American Association for the Advancement of Science, 293, 269.*

Hawley's Condensed Chemical Dictionary, Lewis, 1997, John Wiley and Sons.*

* cited by examiner

Primary Examiner—Carl D. Friedman
Assistant Examiner—Steve Varner
(74) Attorney, Agent, or Firm—Jackson Walker LLP

(57) ABSTRACT

A Formwork includes rigid casting panels constructed to receive a batch of poured concrete. The surfaces of the panel exposed to contact the concrete are covered with a water absorbing liner coated or impregnated with a photocatalysis compound. The photocatalysis compound in a semiconductor material, such as titanium dioxide powder, which activated by sunlight to generate oxygen radicals.

15 Claims, 1 Drawing Sheet

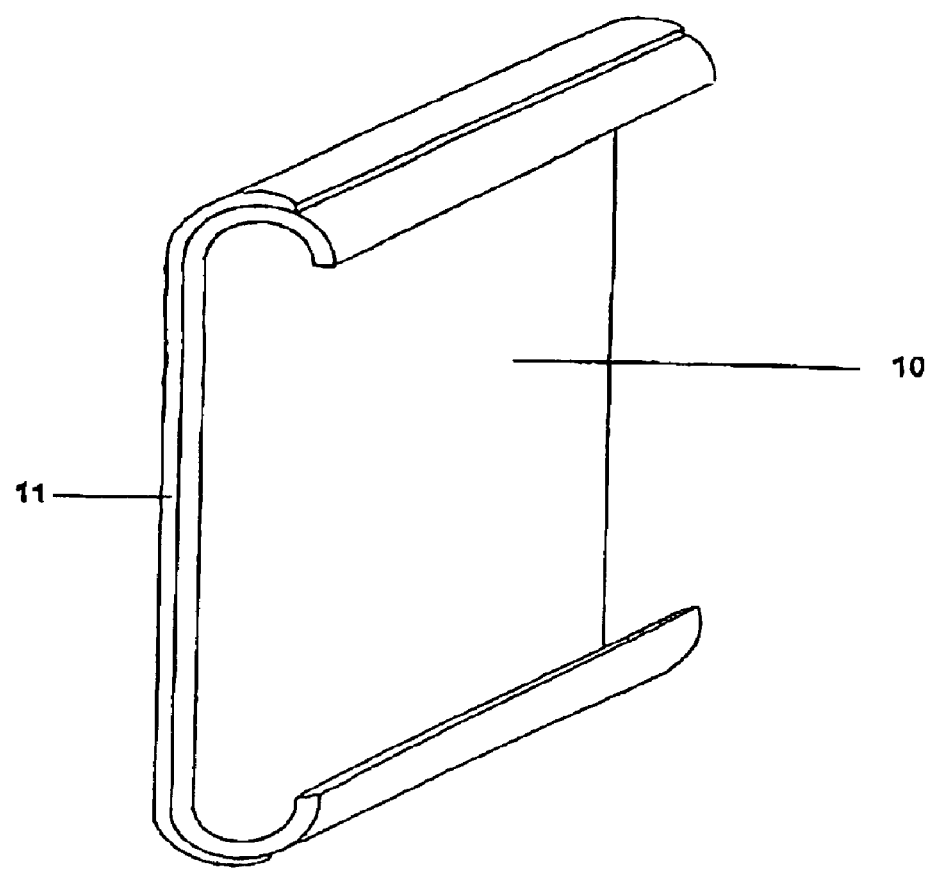

FORMWORK

BACKGROUND TO THE INVENTION

1. Field of the Invention

The invention relates to formwork.

2. Background Information

Formwork is used for casting concrete structures in situ or modular concrete building blocks and panels. Traditionally, especially for structures, the formwork is made up of suitable pieces of plywood board and held together to provide an open-topped cavity into which concrete is poured and allowed to cure. The panels may be removed before the concrete is fully cured, typically 20 to 30 hours after the pouring. Metal formwork panels may also be used and have the advantage, generally stated, of being re-usable without modification but the disadvantage of being more expensive and much heavier and so less easy to manhandle. Metal formwork is less adaptable to form complex shapes or formwork "tailor-made" for each structure requiring to be cast in the progressive construction of a building, for example.

For both wooden and metallic formwork it is a normal requirement to create a good, even and consistent surface finish in the cast panels or blocks. This is especially the case where the surface is designed to be later clad with tiles. Imperfections and structural weakness in the surface lead to egress of dampness behind the cladding and ultimate failure of the tile bonding. It has been found that wood is often preferable to create a good surface finish because wood absorbs free surface water and bleeding water released from the poured concrete.

Typically, a release agent must be applied to the wood or metal formwork so that it can be separated from the cured concrete structure without damage to the surface finish. Residue from the release agent is left on the finished surface. Most release agents are manufactured from organic compounds, which are a food source for biological organisms such as fungi, bacteria, algae and lichens This can lead to accelerated growth of these organisms on the concrete surface.

A number of chemicals are added to concrete to control setting time, plasticity, pumpability, water content, freethaw resistance, strength and color, etc. It is also known to add fungicides, germicides and insecticides to the concrete to help control for biological organisms.

However, these chemical admixtures can result in the off-gassing of small quantities of formaldehydes and other chemicals from the finished concrete. For chemically sensitive clients it may be a requirement to minimize the use of these admixtures.

It is known to use porous plastic sheeting to cover the exposed surfaces of a formwork. This is known in the art as Controlled Permeability Formwork or CPF. Water can leave the poured cavity surfaces through the plastic sheeting. Additionally, no release agent is required and thus the problem of biological organisms is minimized. The disadvantage with the CPF system is that the porous plastic sheeting is expensive and a drainage system is required to channel away water that passes; through the sheeting.

SUMMARY OF THE INVENTION

It is an object of the invention to overcome or at least reduce these problems.

According to a first aspect of the invention there is provided formwork including rigid casting panels constructed to receive a batch of poured concrete, in which surfaces of the panels exposed to contact the concrete are coated or impregnated with a photocatalysis compound.

Preferably, the photocatalysis compound is applied to a release agent or water absorbing liner covering the surfaces of the panels exposed to contact the concrete.

Preferably, the liner comprises a layer of paper. More preferably, the liner comprises a layer of recycled waste paper.

Preferably, the panels are metallic, wooden, plastic or composite of rigid materials.

Preferably, the photocatalysis compound is a semiconductor material activated by sunlight to generate oxygen radicals. More preferably, the photocatalysis compound is titanium dioxide powder.

Preferably, the liner is coated or impregnated with the photocatalysis compound by means of sputtering, or water soluble resin, or ion planting, or spraying with other chemical compounds, or spraying in the process of paper panel manufacturing.

According to a second aspect of the invention there is provided formwork including rigid casting panels constructed to receive a hatch of poured concrete, in which surfaces of the panel exposed to contact the concrete are covered with a water absorbing liner coated or impregnated with a photocatalysis compound.

According to a third aspect of the invention there is provided formwork comprising rigid casting panels constructed to receive a batch of poured concrete, in which surfaces of the panel exposed to contact the concrete are completely covered with a liner comprising a layer of paper.

Further aspects of the invention will become apparent from the following description, which is given by way of example only.

BRIEF DESCRIPTION OF THE DRAWINGS

Formwork according to the invention will now be described by way of example with reference to the accompanying drawing showing an isometric view of a single formwork panel.

DESCRIPTION OF THE PREFERRED EMBODIMENTS

Referring to the drawing, a rigid rectangular panel 10 is made of metal. A liner 11 formed of a paper layer is glued or otherwise held securely to the panel to cover a major surface of the panel that is exposed to and contacted by a batch of poured concrete in use.

The panels are clamped or otherwise joined together in conventional fashion to make up a suitable formwork structure. The liner 11 absorbs free water at the surface of concrete poured into formwork structure at an early stage and maintains a humid atmosphere for later curing. No drainage system is required. Also, it is usually preferably to form the liner 11 for the composite structure from a single sheet of paper and to secure suitably cut lengths of the sheet after the composite structure has been made up. This ensures that the liner 11 wholly seals off joints between the panels and any inside corners of the composite structure. The liner 11 is used only once but can re-cycled if desired. When the formwork is removed from a cured or partially cured concrete casting, the liner 11 or parts of the liner may be easily removed and dismantled. The liner 11 or parts thereof are easily removed by hand in the early stages of curing, say within 24-hours. After this the liner can be easily removed by spraying or washing the surface of the casting with tap water.

Re-cycled paper waste sheeting is particularly suitable for forming the liner 11 due to its inherent rough/fibrous consistency. Such material, indeed all paper material, is very cheap and also makes the described formwork and environmentally-friendly product.

Typically the layer of paper is made up of recycled paper waste, but other generally 'rough' paper may also be used, including paper made up with some small proportions of spongy or other water absorbing and transporting compositions.

The panels may be wooden, plastic or made up of combined or composite rigid materials.

To solve the problem of off-gassing, and mold and mildew growth on the concrete surface, the liner 11 is coated or impregnated with a photocatalysis compound that is transferred to the concrete surface during curing. The compound reacts with moisture and light to produce activated oxygen to purify the toxic gas and/or smell, and minimize biological organisms. In the preferred embodiment titanium dioxide ($TiO_2$) powder is used as the photocatalysis. Titanium dioxide is an inexpensive semiconductor material that is activated by sunlight to generate oxygen radicals, In alternative embodiments the photocatalysis compound is applied directly to the formwork surface, or to a release agent coating the formwork surface in direct contact with poured concrete.

The liner 11 can be coated or impregnated with titanium dioxide powder by way of sputtering, water soluble resin, is ion planting, spraying assisted with other chemical compounds or spraying in the process of paper panel manufacturing. The titanium dioxide powder is trapped on the concrete surface during the release water from fresh concrete transfer to the paper panel. After the concrete has hardened a titanium dioxide powder film will be left on the surface of concrete. This film will react with moisture and light to produce activated oxygen to purify the toxic gas and/or smell and minimize the biological problem.

Where in the foregoing description reference has been made to integers or elements having known equivalents then such are included as it individually set forth herein.

Embodiments of the invention have been described, however it is understood that variations, improvements or modifications can take place without departure from the spirit of the invention or scope of the appended claims.

What is claimed is:

1. Formwork comprising:
   rigid casting panels constructed to receive a batch of poured concrete for curing, surfaces of the panels exposed to contact the concrete coated or impregnated with a photocatalysis compound that generates oxygen radicals when activated by sunlight, the photocatalysis compound transferring to the contacting concrete surface during curing of the concrete.

2. Formwork as claimed in claim 1 in which the photocatalysis compound is applied to a release agent or a water absorbing liner covering the surfaces of the panels exposed to contact the concrete.

3. Formwork as claimed in claim 2 in which the liner comprises a layer of paper.

4. Formwork as claimed in claim 2 in which the liner comprises a layer of recycled waste paper.

5. Formwork as claimed in claim 2 in which the liner is coated or impregnated with the photocatalysis compound by means of sputtering, or water soluble resin, or ion planting, or spraying with other chemical compounds, or spraying in the process of paper panel manufacturing.

6. Formwork as claimed in claim 1 in which the panels are metallic, wooden, plastic or composite of rigid materials.

7. Formwork as claimed in claim 1 in which the photocatalysis compound is titanium dioxide powder.

8. Formwork comprising:
   rigid casting panels constructed to receive a batch of poured concrete for curing, surfaces of the panels exposed to contact the concrete coated or impregnated with a semiconductor material activated by sunlight to generate oxygen radicals, the photocatalysis compound transferring to the contacting concrete surface during curing of the concrete.

9. Formwork comprising:
   rigid casting panels constructed to receive a batch of poured concrete for curing, surfaces of the panel exposed to contact the concrete covered with a water absorbing liner coated or impregnated with a photocatalysis compound that generates oxygen radicals when activated by sunlight, the photocatalysis compound transferring to the contacting concrete surface during curing of the concrete.

10. Formwork as claimed in claim 9 in which the liner comprises a layer of paper.

11. Formwork as claimed in claim 9 in which the liner comprises a layer of recycled waste paper.

12. Formwork as claimed in claim 9 in which the panels are metallic.

13. Formwork as claimed in claim 9 in which the photocatalysis compound is titanium dioxide powder.

14. Formwork as claimed in claim 9 in which the liner is coated or impregnated with the photocatalysis compound by means of sputtering, or water soluble resin, or ion planting, or spraying with other chemical compounds, or spraying in the process of paper panel manufacturing.

15. Formwork comprising:
   rigid casting panels constructed to receive a batch of poured concrete for curing, surfaces of the panel exposed to contact the concrete covered with a water absorbing liner coated or impregnated with a semiconductor material activated by sunlight to generate oxygen radicals, the photocatalysis compound transferring to the contacting concrete surface during curing of the concrete.

* * * * *